United States Patent
Dobrowolski et al.

(10) Patent No.: US 12,544,835 B2
(45) Date of Patent: Feb. 10, 2026

(54) ADDITIVE MANUFACTURING SYSTEMS WITH A CONTAMINANT REMOVAL SYSTEM AND METHODOLOGIES FOR REMOVING CONTAMINANTS DURING ADDITIVE MANUFACTURING PROCESSES

(71) Applicant: Baker Hughes Oilfield Operations LLC, Houston, TX (US)

(72) Inventors: Thomas Dobrowolski, The Woodlands, TX (US); Andrew Platt, Houston, TX (US); Monte Lively, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 242 days.

(21) Appl. No.: 18/063,187

(22) Filed: Dec. 8, 2022

(65) Prior Publication Data

US 2024/0189909 A1    Jun. 13, 2024

(51) Int. Cl.
*B22F 10/68* (2021.01)
*B22F 10/28* (2021.01)
(Continued)

(52) U.S. Cl.
CPC .............. *B22F 10/68* (2021.01); *B22F 10/28* (2021.01); *B22F 10/66* (2021.01); *B22F 10/85* (2021.01);
(Continued)

(58) Field of Classification Search
CPC .......... B22F 10/68; B22F 10/28; B22F 10/66; B22F 10/85; B22F 12/30; B22F 12/50;
(Continued)

(56) References Cited

U.S. PATENT DOCUMENTS

| | | |
|---|---|---|
| 2019/0134732 A1 | 5/2019 | Sakai et al. |
| 2019/0232369 A1 | 8/2019 | Strössner et al. |

(Continued)

OTHER PUBLICATIONS

International Search Report for Application No. PCT/US2023/082111 dated Apr. 1, 2024, 4 pages.

(Continued)

*Primary Examiner* — Ricardo D Morales
(74) *Attorney, Agent, or Firm* — TraskBritt (57) ABSTRACT

An additive manufacturing system includes an additive manufacturing apparatus and control circuitry. The apparatus includes a build chamber, a platform, a material delivery system, a laser system, and a contaminant remover. The platform is positioned in the build chamber and is configured to support one or more objects being manufactured. The material delivery system is configured to provide feedstock material to the build chamber. The laser system is configured to melt the feedstock material to form the one or more objects being manufactured. The contaminant remover is configured to remove contaminants from a top layer of the one or more objects being manufactured prior to the material delivery system depositing a layer of the feedstock material thereon. The control circuitry is configured to control at least a portion of operation of the additive manufacturing apparatus. Contaminants may be removed from an object during manufacture of the object with the system.

20 Claims, 4 Drawing Sheets

(51) Int. Cl.
*B22F 10/66* (2021.01)
*B22F 10/85* (2021.01)
*B22F 12/30* (2021.01)
*B22F 12/50* (2021.01)
*B22F 12/60* (2021.01)
*B33Y 10/00* (2015.01)
*B33Y 30/00* (2015.01)
*B33Y 40/20* (2020.01)
*B33Y 50/02* (2015.01)

(52) U.S. Cl.
CPC .............. *B22F 12/30* (2021.01); *B22F 12/50* (2021.01); *B22F 12/60* (2021.01); *B33Y 10/00* (2014.12); *B33Y 30/00* (2014.12); *B33Y 40/20* (2020.01); *B33Y 50/02* (2014.12)

(58) Field of Classification Search
CPC .......... B22F 12/60; B22F 10/37; B22F 12/90; B22F 2999/00; B22F 12/67; B22F 12/70; B33Y 10/00; B33Y 30/00; B33Y 40/20; B33Y 50/02; B33Y 40/00
See application file for complete search history.

(56) References Cited

U.S. PATENT DOCUMENTS

| | | |
|---|---|---|
| 2020/0147869 A1 | 5/2020 | Muir |
| 2021/0094229 A1 | 4/2021 | Patel et al. |
| 2021/0206087 A1 | 7/2021 | Geile et al. |
| 2024/0351286 A1* | 10/2024 | Vatani .................. B29C 64/393 |

OTHER PUBLICATIONS

International Written Opinion for Application No. PCT/US2023/082111 dated Apr. 1, 2024, 5 pages.

* cited by examiner

ADDITIVE MANUFACTURING SYSTEMS WITH A CONTAMINANT REMOVAL SYSTEM AND METHODOLOGIES FOR REMOVING CONTAMINANTS DURING ADDITIVE MANUFACTURING PROCESSES

TECHNICAL FIELD

The present disclosure relates generally to additive manufacturing systems, and more specifically to contaminant removal systems and methodologies for additive manufacturing processes.

BACKGROUND

Laser powder bed fusion (L-PBF) is a metal additive manufacturing technology with a wide range of applications in the aerospace, medical, and energy industries. Since L-PBF uses metal powder as feedstock material, contaminants, such as weld contaminants including welding spatter, soot, and welding fumes, are generated. While contaminants are generally carried away by an in-process gas flow, some contaminants, such as soot, may deposit on the powder bed during the manufacturing process. These contaminant deposits may cause undesired effects that can impact the quality and reliability of the final product.

The above-described background relating to L-PBF is merely intended to provide a contextual overview of some current issues and is not intended to be exhaustive. Other contextual information may become apparent to those of ordinary skill in the art upon review of the following description of exemplary embodiments.

BRIEF SUMMARY

In one illustrative embodiment, the present disclosure provides an additive manufacturing system. The additive manufacturing system includes an additive manufacturing apparatus and control circuitry. The additive manufacturing apparatus includes a build chamber, a platform, a material delivery system, a laser system, and a contaminant remover. The platform is positioned in the build chamber and is configured to support one or more objects being manufactured. The material delivery system is configured to provide feedstock material to the build chamber. The laser system is configured to melt the feedstock material to form the one or more objects being manufactured. The contaminant remover is configured to remove contaminants from a top layer of the one or more objects being manufactured prior to the material delivery system depositing a layer of the feedstock material thereon. The control circuitry is configured to control at least a portion of operation of the additive manufacturing apparatus.

In another illustrative embodiment, the present disclosure provides a material delivery system for an additive manufacturing system configured to manufacture one or more objects on a platform. The material delivery system includes a body, a powder outlet, a powder leveler, and a contaminant remover. The powder outlet is formed in a bottom of the body. The powder leveler is positioned at the bottom of the body behind the powder outlet relative to a first direction. The powder leveler is configured to level the feedstock material after the feedstock material is deposited on the platform and the one or more objects. The contaminant remover is configured to remove contaminants from a top layer of the one or more objects prior to the material delivery system depositing a layer of the feedstock material on the platform and the one or more objects.

In a further illustrative embodiment, the present disclosure provides a method for controlling an additive manufacturing system for manufacturing one or more objects. The additive manufacturing system includes an additive manufacturing apparatus and control circuitry. The method includes controlling, with the control circuitry, the additive manufacturing apparatus to form a top layer of the one or more objects. The additive manufacturing apparatus includes a build chamber, an additive manufacturing apparatus including a platform positioned in the build chamber and configured to support one or more objects, a material delivery system configured to provide feedstock material to the build chamber, a laser system configured to melt the feedstock material to form layers of the one or more objects, and a contaminant remover configured to remove contaminants from the top layer of the one or more objects. The method also includes controlling, with the control circuitry, the contaminant remover to remove the contaminant from the layer of the one or more objects formed prior to the material delivery system depositing a subsequent layer of the feedstock material thereon. The method further includes controlling, with the control circuitry, the material delivery system to deposit the subsequent layer of the feedstock material on the top layer after the contaminant remover removes the contaminants from the top layer.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

In various embodiments, the present disclosure relates to systems and methods for removing contaminants, such as weld contaminants including weld splatter and soot, during an additive manufacturing process to reduce and prevent contamination of objects produced by the additive manufacturing process. Additive manufacturing processes includes various manufacturing methods (modalities) that allow "growing" an object from feedstock (e.g., powder, wire, filament, etc.) layer by layer into a desired shape rather than removing material from bar stock. Advantages of additive manufacturing include relative simplicity of manufacturing and freedom of design (e.g., shape complexity does not hinder manufacturability). As compared to subtractive manufacturing, additive manufacturing is simple because it uses fewer manufacturing steps, most of the process occurs in a single additive manufacturing apparatus.

As will be outlined in greater detail below, the additive manufacturing system includes one or more contaminant removers that are configured to remove contaminants, such as welding contaminants including soot, welding splatter, and or other undesirable materials, from a top of one or more objects after a layer of the one or more objects is formed and prior to depositing feedstock material that will be used to form the subsequent layer on the one or more objects. By removing contaminants prior to depositing a layer of feedstock material, contamination can be reduced and homogeneity of the one or more objects may be improved.

Figure 1:
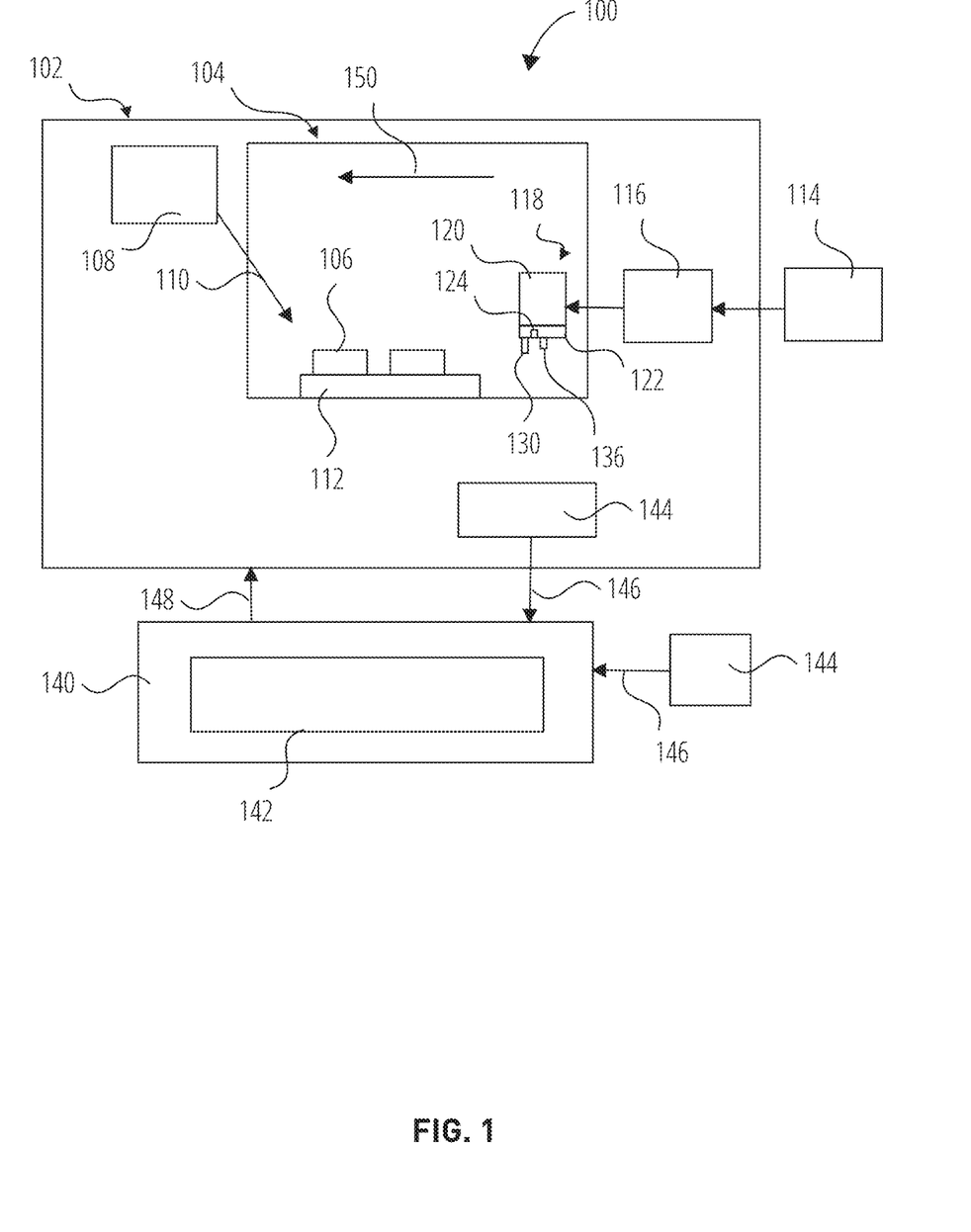
FIG. 1 is a block diagram of an additive manufacturing system in accordance with embodiments of the present disclosure.

FIG. 1 is a block diagram of an additive manufacturing system 100 in accordance with embodiments of the present disclosure. The additive manufacturing system 100 includes an additive manufacturing apparatus 102 and control circuitry 140 operably coupled to the additive manufacturing apparatus 102. In some embodiments, the additive manufacturing apparatus 102 is a L-PBF system. The additive manufacturing apparatus 102 is configured to receive a feedstock material 114 and manufacture an object 106 or objects 106 using the feedstock material 114.

In the embodiment illustrated in FIG. 1, the additive manufacturing apparatus 102 includes a build chamber 104, a platform 112, a material feed 116, a material delivery system 118, a contaminant remover 130, and laser system 108. The platform 112 is positioned within the build chamber 104 and is configured to be raised and lowered based on commands received by the additive manufacturing apparatus 102 from the control circuitry 140. The platform 112 is configured to support one or more objects 106 being manufactured by the additive manufacturing apparatus 102.

The material feed 116 is configured to receive the feedstock material 114, such as a powdered metal, to be used in the additive manufacturing of the one or more objects 106. In some embodiments, the material feed 116 is a hopper or an auger that is configured to provide the feedstock material 114 to the material delivery system 118, which in turn is configured to deliver the feedstock material 114 to the platform 112 in the build chamber 104.

In some embodiments, the material delivery system 118 is configured to provide a feedstock material 114 that includes powdered metal. In these embodiments, the material delivery system 118 is a recoater system that is configured to deposit a layer of the powdered metal (feedstock material 114) onto the platform 112 and the one or more objects 106 at a uniform height, which will be used for forming the next layer of the one or more objects 106. The recoater system includes a body 120, a powder outlet 124, and powder leveler 136. The powder outlet 124 is configured to deposit the powder received from the material feed 116 onto the platform 112 and the one or more objects 106 as the material delivery system 118 moves across the build chamber 104, such as in a first direction 150, to recoat the platform 112 and the one or more objects 106 with the feedstock material 114 of powdered metal. In embodiments, the powder outlet 124 is formed in a bottom of the body 120 and is configured to deposit the powdered metal by spraying or gravity feeding the powdered metal onto the platform 112 and the one or more objects 106. The powder leveler 136 is positioned on a bottom of the body 120 behind the powder outlet 124 relative to the first direction 150 and is configured to level the powder to a uniform height after the powder is deposited on the platform 112 and the one or more objects 106. The uniform height is based on a predetermined thickness of the layer of feedstock material 114 that is to be deposited for forming each subsequent layer of the one or more objects 106. In some embodiments, the powder leveler 136 includes a blade or a brush that is configured to level the powder.

As will be described in further detail below, the contaminant remover 130 is configured to remove contaminants from a top layer of one or more objects 106 prior to a layer of powder being deposited thereon. In some embodiments, the contaminant remover 130 is configured to move in the first direction 150 in front of the powder outlet 124. In the embodiment illustrated in FIG. 1, the contaminant remover 130 is positioned at and extends from the bottom of the body 120 in front of the powder outlet 124 relative to the first direction 150. In some of these embodiments, the contaminant remover 130 is positioned adjacent to the powder outlet 124. In other embodiments, the contaminant remover 130 is a separate component from the material delivery system 118, which is configured to move in front of the material delivery system 118 relative to the first direction 150. In embodiments, the contaminant remover 130 includes at least one contaminant removing component chosen from a contaminant abrader 132 (refer to FIGS. 2 and 3) and one or more nozzles 134 (refer to FIGS. 3 and 4). Thus, in some of these embodiments, the contaminant remover 130 only includes the contaminant abrader 132 or the one or more nozzles 134, while in other of these embodiments, the contaminant remover 130 includes both the contaminant abrader 132 and the one or more nozzles 134.

In some embodiments, the material delivery system 118 is also configured to deposit powder while moving across the build chamber 104 in a second direction, opposite the first direction 150. In some of these embodiments, the material delivery system 118 includes a second powder outlet 124 that is positioned on an opposite side of the powder leveler 136 from the powder outlet 124, such that the second powder outlet 124 is positioned in front of the powder leveler 136 relative to the second direction. In these embodiments, the contaminant remover 130 or a second contaminant remover 130 is configured to move in the second direction in front of the second powder outlet 124.

The material delivery system 118 includes a bottom portion 122 that forms the bottom of the material delivery system 118. In some embodiments, the bottom portion 122 is formed with the body 120. In other embodiments, the bottom portion 122 is a separate component that is joined to the body 120. In some embodiments, the bottom portion 122 is a slider. In some of these embodiments, the powder outlet 124, the powder leveler 136, and the contaminant remover 130 are positioned in or mounted to the bottom portion 122.

The laser system 108 is configured to direct a laser beam 110 onto the feedstock material 114 to melt the feedstock material 114 and to form the one or more objects 106. The additive manufacturing apparatus 102 is configured to manufacture the one or more objects 106 on the platform 112, layer by layer, as the feedstock material 114 is fed to the material feed 116, delivered to the platform 112 by the material delivery system 118, and melted by the laser beam 110.

In some embodiments, the additive manufacturing system 100 further includes sensors 144 (e.g., internal to the additive manufacturing apparatus 102 and/or external to the additive manufacturing apparatus 102). In some of these embodiments, the sensors 144 are configured to monitor various aspects of the manufacturing process, such as conditions of the additive manufacturing apparatus 102, various input factors, and manufacturing outcomes. The sensors 144 are configured to generate sensor signals 146 and provide the sensor signals 146 to the control circuitry 140.

The control circuitry 140 is configured to control at least a portion of operation of the additive manufacturing apparatus 102. The control circuitry 140 is configured to control the additive manufacturing apparatus 102 using control signals 148 including commands configured to indicate to the additive manufacturing apparatus 102 specifics of operation. By way of non-limiting examples, the control circuitry 140 is configured to control feeding of the feedstock material 114 into the material feed 116, operation of the material delivery system 118, the contaminant remover 130, operation of the laser system 108, operation of the sensors 144, other operations, or combinations thereof.

In embodiments, the control circuitry 140 is configured to store manufacturing instructions, the input factors, data obtained from the sensor signals 146, and the like in one or more data storage devices 142.

Figure 2:
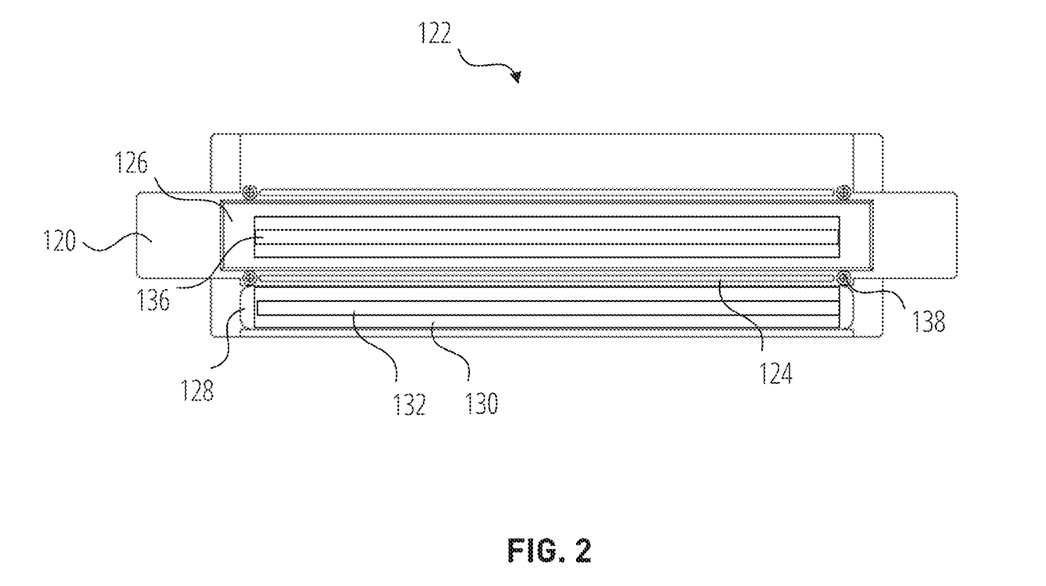
FIG. 2 is a bottom view of an embodiment of the material delivery system for the additive manufacturing system of FIG. 1 in accordance with the present disclosure.
Figure 3:
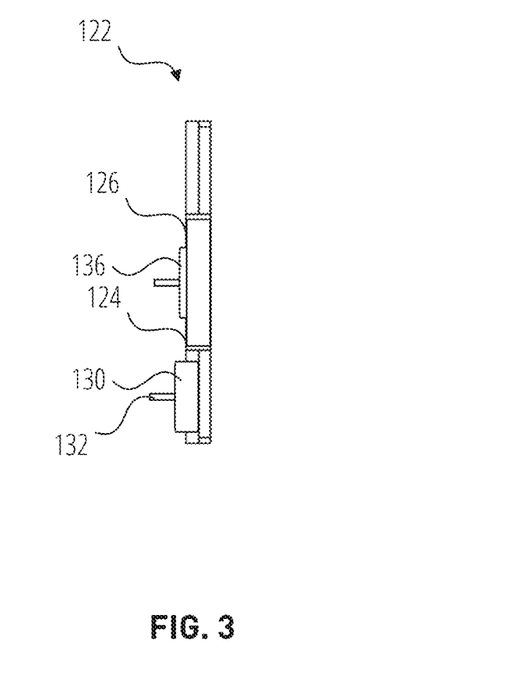
FIG. 3 is a side view of a bottom portion of the material delivery system of FIG. 2.

FIG. 2 is a bottom view of an embodiment of the material delivery system 118 for the additive manufacturing system 100 of FIG. 1 in accordance with the present disclosure. FIG. 3 is a side view of a bottom portion 122 of the material delivery system 118 of FIG. 2. Referring to FIGS. 1-3, as noted above, in some embodiments, the contaminant remover 130 includes a contaminant abrader 132. In some of these embodiments, the contaminant abrader 132 includes at least one contact component chosen from among a blade, a brush, and a rubber component.

The contaminant abrader 132 is configured to physically contact a top layer (i.e., the most recently formed layer) of the one or more objects 106 to remove contaminants therefrom. In embodiments, the contaminant abrader 132 is configured to remove contaminants from a top of the one or more objects 106 by traversing across a top surface of the one or more objects 106 while in physical contact therewith by mechanical abrasion and by pushing the contaminants off of the top layer of the one or more objects 106. In some embodiments, a relative position of a distal end of the contaminant abrader 132 is below the top surface of the one or more objects 106 during a contaminant removal process, such that the portions of the contaminant abrader 132 while contacting the one or more objects 106 are in an interference condition with the one or more objects 106. In these embodiments, the contaminant abrader 132 is rigid enough to remove contaminants and ductile enough to bend while in the interference condition so as to not damage the one or more objects 106, and in particular, the top layer of the one or more objects 106.

In some embodiments, the relative position between the distal end of the contaminant abrader 132 and the top surface of the one or more objects 106 is obtained by moving the material delivery system 118 relative to the platform 112, by moving the platform 112 relative to the material delivery system 118, or a combination thereof.

In some embodiments, the distal end of the contaminant abrader 132 is positioned further from a bottom of the material delivery system 118 than a distal end of the powder leveler 136 (i.e., the distal end of the contaminant abrader 132 is positioned lower than the distal end of the powder leveler 136 when installed within the additive manufacturing apparatus 102). In some embodiments, the distal end of the contaminant abrader 132 is positioned further from the bottom of the material delivery system 118 than the distal end of the powder leveler 136 by at least more than one layer thickness (i.e., at least more than one layer thickness lower). A layer thickness being the thickness of each layer of the one or more objects 106 being formed by the additive manufacturing apparatus 102. In some embodiments, the distal end of the contaminant abrader 132 is positioned further from the bottom of the material delivery system 118 than the distal end of the powder leveler 136 between 1.1 times the layer thickness and 3 times the layer thickness. For example, in some of these embodiments, the distal end of the contaminant abrader 132 is positioned further from the bottom of the material delivery system 118 than the distal end of the powder leveler 136 by about one and a half times the layer thickness (i.e., about one and a half times the layer thickness lower).

In embodiments, the contaminant abrader 132 is formed of a material chosen from metals (e.g., steel) or polymers (e.g., elastomers, plastics, etc.), and the like. In some embodiments, the contaminant abrader 132 includes an implement chosen from a blade and a brush. In some of these embodiments, the contaminant abrader 132 is the same, similar, or substantially similar to the powder leveler 136, such as a blade or a brush of the powder leveler 136.

In some embodiments, the contaminant abrader 132 is connected to the material delivery system 118 via the bottom portion 122. In some of these embodiments, the bottom portion 122 includes a contaminant remover pocket 128 formed in a bottom surface thereof. The contaminant abrader 132 is coupled to the bottom portion 122 at the contaminant remover pocket 128. In some embodiments, the contaminant remover pocket 128 is configured to removably couple the contaminant abrader 132 to the bottom portion 122.

In some embodiments, a height of the contaminant abrader 132 (i.e., the distance that the distal end of the contaminant abrader 132 extends from a bottom of the material delivery system 118) is adjustable. In some embodiments, the material delivery system 118 includes counter bores 138 formed in a bottom thereof, such as in the bottom portion 122. The counter bores 138 are configured to adjust the height of the contaminant abrader 132.

In some embodiments, the bottom portion 122 includes a powder leveler mount 126 formed in a bottom thereof that is configured to receive the powder leveler 136 and removably couple the powder leveler 136 to the bottom portion 122.

Figure 4:
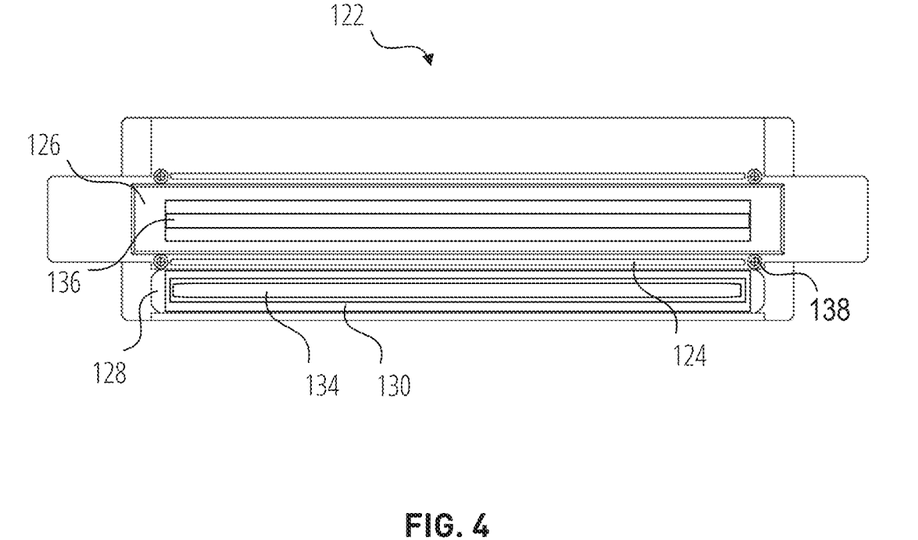
FIG. 4 is a bottom view of another embodiment of the material delivery system for the additive manufacturing system of FIG. 1 in accordance with the present disclosure.
Figure 5:
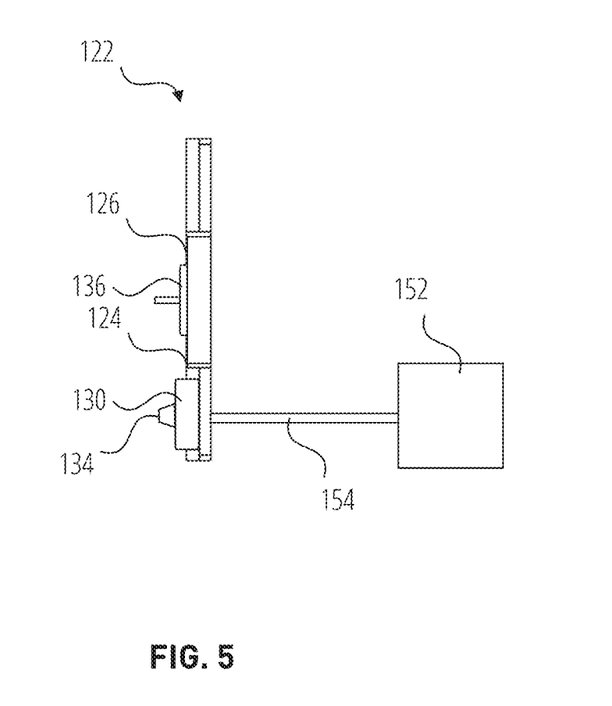
FIG. 5 is a schematic side view of the bottom portion of the material delivery system of FIG. 4 with a gas displacement mechanism.

FIG. 4 is a bottom view of another embodiment of the material delivery system 118 for the additive manufacturing system 100 of FIG. 1 in accordance with the present disclosure. FIG. 5 is a schematic side view of the bottom portion 122 the material delivery system of FIG. 4 with a gas displacement mechanism 152. Referring to FIGS. 1, 4 and 5, as noted above, in some embodiments, the contaminant remover 130 includes one or more nozzles 134. The one or more nozzles 134 are connected to an gas displacement mechanism 152 via tubing 154, such as hoses, pipes, and the like. In embodiments, the gas displacement mechanism 152 is a device chosen from a vacuum, a blower, a compressor, and the like. In some embodiments, the gas displacement mechanism 152 can be any device that causes at least one gas flow chosen from suction and expulsion at the one or more nozzles 134. In embodiments where the flow of gas is expulsion, the gas may be the same gas that is held within the build chamber 104 during the additive manufacturing process, such as an inert gas or air. In other embodiments, the gas includes a reactant that reacts with contaminants to facilitate the removal thereof.

In some embodiments, the gas displacement mechanism 152, the tubing 154, and the one or more nozzles 134 (hereinafter the combination is referred to as a gas flow mechanism) are configured to generate a suction at the top surface of the one or more objects 106 as the contaminant remover 130 traverses across the build chamber 104 to remove contaminants by sucking the contaminants from the top surface of the one or more objects 106. In some embodiments, the one or more nozzles 134 are configured to supply an equal suction force across each of the one or more nozzles 134 as the one or more nozzles 134 transverse across the build chamber 104 during a contaminant removal operation.

In other embodiments, the gas flow mechanism is configured to generate an expulsion of gas at the top surface of the one or more objects 106 as the contaminant remover 130 traverses across the build chamber 104 to remove contaminants by blowing the contaminants from the top surface of the one or more objects 106. The additive manufacturing apparatus 102 may be configured to cause a separate gas flow across the build chamber 104 which may carry the contaminants to a filter that is configured to capture the contaminants from the gas. A vacuum may be situated to draw the gas flow across the build chamber 104 and to draw the gas through the filter. In some embodiments, the one or more nozzles 134 are configured to supply an equal blowing force across each of the one or more nozzles 134 as the one or more nozzles 134 transverse across the build chamber 104 during a contaminant removal operation.

Figure 6:
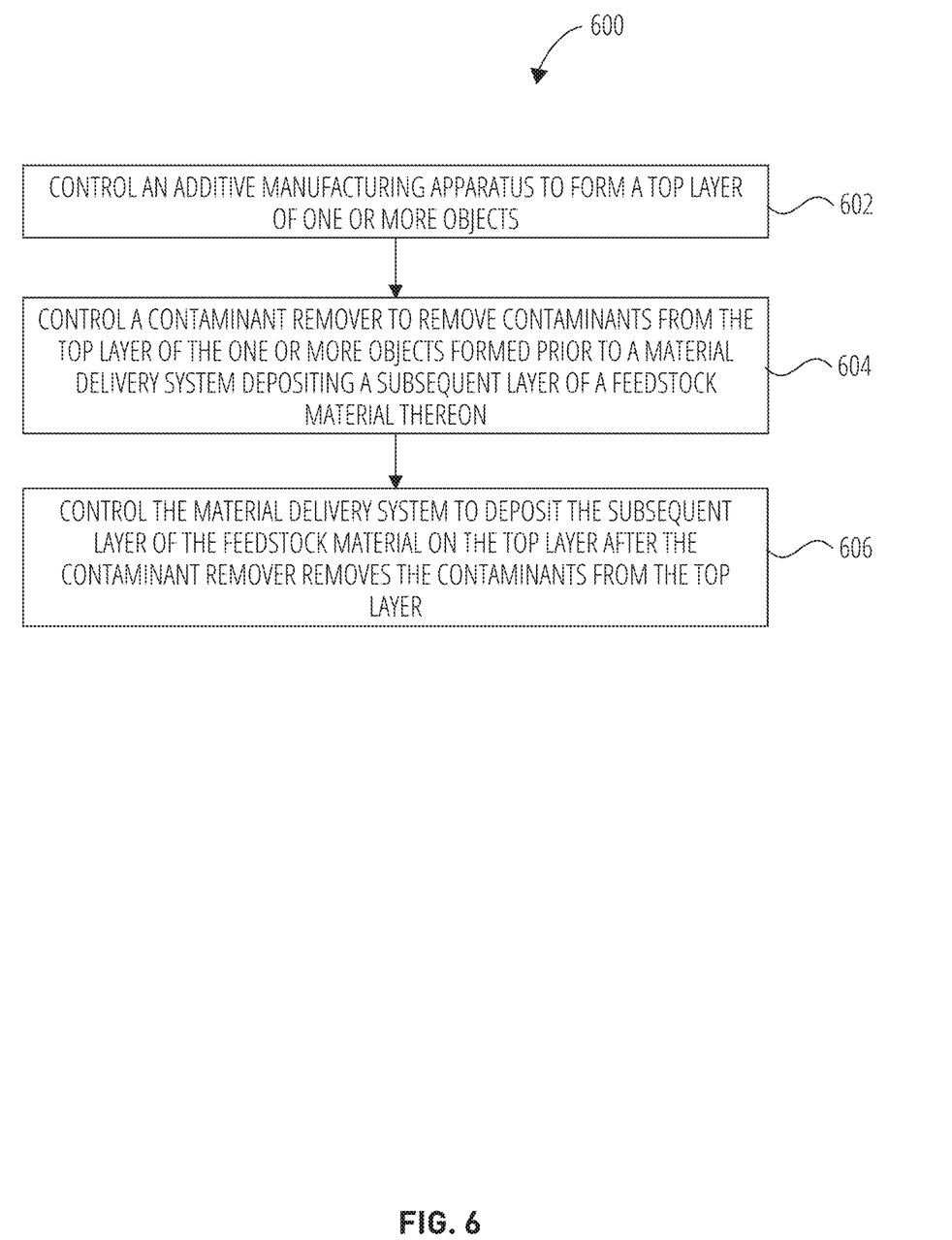
FIG. 6 illustrates a method 600 for controlling an additive manufacturing system, in accordance with one embodiment of the present disclosure.

FIG. 6 illustrates a method 600 for controlling an additive manufacturing system, in accordance with one embodiment of the present disclosure. The method 600 includes controlling the additive manufacturing apparatus 102 to form a top layer of the one or more objects 106 at step 602. The method 600 also includes controlling the contaminant remover 130 to remove the contaminants from the layer of the one or more objects 106 formed prior to the material delivery system 118 depositing a subsequent layer of the feedstock material 114 thereon at step 604. The method 600 further includes controlling the material delivery system 118 to deposit the subsequent layer of the feedstock material 114 on the top layer after the contaminant remover 130 removes the contaminants from the top layer at step 606.

In some embodiments of the method 600 where the contaminant remover 130 comprises a contaminant abrader 132, the method yet further includes controlling a relative position between the contaminant abrader 132 and the platform 112 such that a relative position of a distal end of the contaminant abrader 132 is below a top surface of the one or more objects 106 while removing the contaminants from the layer of the one or more objects 106. In some embodiments, the controlling the relative position between the contaminant abrader 132 and the platform is controlled by modifying a height of the platform 112, such as via a platform height control, by modifying a height of the material delivery system 118, or by a combination thereof. In some of these embodiments, removing the contaminants from the layer of the one or more objects 106 includes mechanical abrasion (caused by moving the contaminant abrader 132 across a top surface of the one or more objects 106 while in physical contact with the one or more objects 106) and pushing the contaminants off of the top layer of the one or more objects 106.

In some embodiments of the method 600 where the additive manufacturing system 100 includes an gas displacement mechanism 152 and the contaminant remover 130 includes one or more nozzles 134 connected to the gas displacement mechanism 152 via tubing 154, removing the contaminants from the layer of the one or more objects 106 includes controlling the gas displacement mechanism 152 to cause at least one gas flow chosen from suction and expulsion at the one or more nozzles 134.

In some embodiments of the method 600, the control circuitry 140 is configured to control the additive manufacturing apparatus 102 during the various steps of the method 600. In some of these embodiments of method 600, the control circuitry 140 is configured to control at least a portion of operation of the additive manufacturing apparatus 102.

By removing contaminants from the layer of the one or more objects 106 formed prior to the material delivery system 118 depositing a subsequent layer of the feedstock material 114 thereon, the quality of the one or more objects being formed by the additive manufacturing system 100 may be improved. In particular, contamination of the feedstock material 114 deposited on the one or more objects 106 that will form a subsequent layer of the one or more objects 106 may be reduced, improving control of the chemical composition of the one or more objects 106 and the homogenous properties thereof and reducing the chance of porosity by removing particles outside of the specified particle size distribution tailored to the manufacturing process. Further, reducing contamination of the feedstock material 114 deposited on the one or more objects 106 may improve a surface quality of the one or more objects 106.

The various illustrative logical blocks, modules, and circuits described in connection with the embodiments of the additive manufacturing system 100, and in particular, the control circuitry 140, disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

Although the present disclosure has been illustrated and described herein with reference to various embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An additive manufacturing system, comprising:
an additive manufacturing apparatus including:
a build chamber;
a platform positioned in the build chamber and configured to support one or more objects being manufactured;
a material delivery system comprising:
a body;
a powder outlet formed in a bottom of the body;
a powder leveler positioned at the bottom of the body behind the powder outlet relative to a first direction, the powder leveler configured to level a feedstock material after the feedstock material is deposited on the platform and the one or more objects; and
a contaminant abrader adjustably connected to the bottom of the body and extending from the bottom of the body, the contaminant abrader configured to:
remove contaminants from a top layer of the one or more objects prior to the material delivery system depositing a layer of the feedstock material on the platform and the one or more objects; and
move, via adjustment thereof, to adjust an engagement position of a distal end of the contaminant abrader relative to the powder leveler from a first position that is positioned further from the bottom of the body than a distal end of the powder leveler to a second position that is positioned further from the bottom of the body than the distal end of the powder leveler, the second position different than the first position;
a laser system configured to melt the feedstock material to form the one or more objects being manufactured; and
control circuitry configured to control at least a portion of operation of the additive manufacturing apparatus.

2. The additive manufacturing system of claim 1, further comprising one or more nozzles configured to connect to a gas displacement mechanism that causes at least one gas flow chosen from suction and expulsion at the one or more nozzles.

3. The additive manufacturing system of claim 1, wherein the contaminant abrader includes at least one contact component chosen from among a blade, a brush, and a rubber component.

4. The additive manufacturing system of claim 3, wherein the contaminant abrader is configured to remove the contaminants from the top layer of the one or more objects by mechanical abrasion and by pushing the contaminants off of the top layer of the one or more objects during a contaminant removal process.

5. The additive manufacturing system of claim 3, wherein a position of the distal end of the contaminant abrader is below a top surface of the one or more objects during a contaminant removal process.

6. The additive manufacturing system of claim 3, wherein the powder outlet is configured to direct the feedstock material received from a material feed onto the platform and the one or more objects as the material delivery system moves across the build chamber in the first direction to recoat the platform and the one or more objects with the feedstock material and the powder leveler configured to level the feedstock material after the feedstock material is deposited on the platform and one or more objects; and
wherein the contaminant abrader is positioned on the bottom of the material delivery system in front of the powder outlet relative to the first direction.

7. The additive manufacturing system of claim 6, wherein the bottom of the body comprises a slider removably coupled to a remainder of the body, the slider including a pocket and counterbores formed at a bottom surface thereof, the pocket configured to receive the contaminant abrader and the counterbores configured for adjusting the operational distance that the distal end of the contaminant abrader extends from a bottom surface of the slider.

8. The additive manufacturing system of claim 1, wherein the control circuitry is configured to:
control the additive manufacturing apparatus to form the top layer of the one or more objects;
control the contaminant remover to remove the contaminants from the top layer of the one or more objects formed prior to the material delivery system depositing a subsequent layer of the feedstock material thereon; and
control the material delivery system to deposit the subsequent layer of the feedstock material on the top layer after the contaminant abrader removes the contaminants from the top layer.

9. A material delivery system for an additive manufacturing system configured to manufacture one or more objects on a platform, the material delivery system comprising:
a body;
a powder outlet formed in a bottom of the body;
a powder leveler positioned at the bottom of the body behind the powder outlet relative to a first direction, the powder leveler configured to level a feedstock material after the feedstock material is deposited on the platform and the one or more objects; and
a contaminant abrader adjustably connected to the bottom of the body and extending from the bottom of the body, the contaminant abrader configured to;
remove contaminants from a top layer of the one or more objects prior to the material delivery system depositing a layer of the feedstock material on the platform and the one or more objects; and
move, via adjustment thereof, to adjust an engagement position of a distal end of the contaminant abrader relative to the powder leveler from a first position that is positioned further from the bottom of the body than a distal end of the powder leveler to a second position that is positioned further from the bottom of the body than the distal end of the powder leveler, the second position different than the first position.

10. The material delivery system of claim 9, further comprising one or more nozzles configured to connect to a gas displacement mechanism that causes at least one gas flow chosen from suction and expulsion at the one or more nozzles.

11. The material delivery system of claim 9, wherein the contaminant abrader includes at least one contact component chosen from a blade, a brush, and a rubber component.

12. The material delivery system of claim 11, wherein the at least one contact component is configured to remove the contaminants from the top layer of the one or more objects by mechanical abrasion and by pushing the contaminants off of the top layer of the one or more objects during a contaminant removal process.

13. The material delivery system of claim 11, wherein a relative position of the distal end of the contaminant abrader is below a top surface of the one or more objects during a contaminant removal process.

14. The material delivery system of claim 11, wherein the contaminant abrader is positioned in front of the powder outlet relative to the first direction.

15. The material delivery system of claim 14, wherein the bottom of the body comprises a slider removably coupled to a remainder of the body, the slider including a pocket and counterbores formed at a bottom surface thereof, the pocket configured to receive the contaminant abrader and the counterbores configured for adjusting the operational distance that the distal end of the contaminant abrader extends from a bottom surface of the slider.

16. A method for controlling an additive manufacturing system for manufacturing one or more objects, the additive manufacturing system including an additive manufacturing apparatus and control circuitry, the method comprising:
controlling, with the control circuitry, the additive manufacturing apparatus to form a top layer of the one or more objects, the additive manufacturing apparatus including a build chamber, an additive manufacturing apparatus including a platform positioned in the build chamber and configured to support one or more objects, a material delivery system comprising: a body; a powder outlet formed in a bottom of the body; a powder leveler positioned at the bottom of the body behind the powder outlet relative to a first direction, the powder leveler configured to level a feedstock material after the feedstock material is deposited on the platform and the one or more objects; and a contaminant abrader adjustably connected to the bottom of the body and extending from the bottom of the body, the contaminant abrader configured to; remove contaminants from a top layer of the one or more objects prior to the material delivery system depositing a layer of the feedstock material on the platform and the one or more objects; and move, via adjustment thereof, to adjust an engagement position of a distal end of the contaminant abrader relative to the powder leveler from a first position that is positioned further from the bottom of the body than a distal end of the powder leveler to a second position that is positioned further from the bottom of the body than the distal end of the powder leveler, the second position different than the first position, and a laser system configured to melt the feedstock material to form layers of the one or more objects;
controlling, with the control circuitry, the contaminant remover to remove the contaminants from the top layer of the one or more objects formed prior to the material delivery system depositing a subsequent layer of the feedstock material thereon; and
controlling, with the control circuitry, the material delivery system to deposit the subsequent layer of the feedstock material on the top layer after the contaminant remover removes the contaminants from the top layer.

17. The method of claim 16, further comprising controlling a relative position between the contaminant abrader and the platform such that a relative position of the distal end of the contaminant abrader is below a top surface of the one or more objects while removing the contaminants from the top layer of the one or more objects.

18. The method of claim 16, wherein removing the contaminants from the top layer of the one or more objects includes mechanical abrasion and pushing the contaminants off of the top layer of the one or more objects.

19. The method of claim 16, wherein the additive manufacturing system includes a gas displacement mechanism and one or more nozzles connected to the gas displacement mechanism via tubing, wherein removing the contaminants from the top layer of the one or more objects includes controlling the gas displacement mechanism to cause at least one gas flow chosen from suction and expulsion at the one or more nozzles.

20. The method of claim 16, wherein the control circuitry is configured to control at least a portion of operation of the additive manufacturing apparatus.

* * * * *